United States Patent [19]

Sonerud

[11] E Patent Number: Re. 32,532

[45] Reissued Date of Patent: Oct. 27, 1987

[54] PIPELAYING APPLIANCE

[76] Inventor: John T. Sonerud, Vintervagen 30, S-824 00 Hudiksvall, Sweden

[21] Appl. No.: 941,686

[22] Filed: Dec. 15, 1986

Related U.S. Patent Documents

Reissue of:

[64] Patent No.: 4,515,522
Issued: May 7, 1985
Appl. No.: 459,118
Filed: Jan. 19, 1983

[30] Foreign Application Priority Data

Jan. 22, 1982 [SE] Sweden ..... 8200365-8

[51] Int. Cl.[4] ..... E02F 5/00

[52] U.S. Cl. ..... 414/747; 37/117.5; 294/67.22; 294/103.2; 414/724; 414/740; 414/910

[58] Field of Search ..... 414/724, 740, 745, 747, 414/908, 910; 37/117.5, DIG. 3, DIG. 12; 294/67.22, 103.2, 104

[56] References Cited

U.S. PATENT DOCUMENTS

| | | | |
|---|---|---|---|
| 597,438 | 1/1898 | Schilling | 414/910 X |
| 1,888,083 | 11/1932 | Holtz | 294/104 |
| 2,708,592 | 5/1955 | Dalkranian | 294/104 X |
| 3,039,810 | 6/1962 | Bellingher et al. | 294/67.22 |
| 3,749,262 | 7/1973 | Stark | 414/724 |
| 3,834,566 | 9/1974 | Hilfiker | 414/910 X |
| 4,000,923 | 1/1977 | Baldwin | 294/81.5 |

FOREIGN PATENT DOCUMENTS

| | | | |
|---|---|---|---|
| 2228903 | 12/1974 | France | 414/745 |
| 629157 | 9/1978 | U.S.S.R. . | |

*Primary Examiner*—Leslie J. Paperner
*Attorney, Agent, or Firm*—Paul & Paul

[57] ABSTRACT

A pipelaying appliance (1) is removably connected to the bucket (2) of an excavator with the aid of a gripping means (3) mounted on the bucket. The appliance includes two gripping arms (7, 8) of which one thrusts into the pipe (9) and the other is situated on the outside of the pipe. The gripping arms are movable to and from each other and are connected to the appliance so that the clamping force of the gripping arms on the pipe wall will be proportional to the weight of the pipe carried by the appliance.

6 Claims, 2 Drawing Figures

PIPELAYING APPLIANCE

Matter enclosed in heavy brackets [ ] appears in the original patent but forms no part of this reissue specification; matter printed in italics indicates the additions made by reissue.

DESCRIPTION

1. Technical Field

The present invention relates to a pipelaying appliance connected to a raisable and lowerable apparatus such as an excavator or a crane, and including a gripping means for removable engagement with a pipe.

2. Background Art

In pipelaying different types of gripping scissors are used for holding the pipe, these scissors hanging freely in slings or on the safety hook of an excavator. These gripping scissors must be manually coupled up to, and uncoupled from the excavator, and manual work is also required to connect the scissors to, and remove them from the pipes. The manual connection is done by a person standing on the ground, and the aligning of a pipe in the pipe trench and the removal of the gripping scissors is carried out by this person when he has got down into the trench. After having joined the pipe to a previously laid pipe with the aid of a special lever means, the person gets up out of the trench again and releases the scissors from the excavator so that the latter can continue with excavation.

This procedure is both time-consuming, labourious and uneconomical. Furthermore there are large accident risks, since the heavy pipes can sway unchecked during the movement to, and lowering into the pipe trench.

DISCLOSURE OF INVENTION

One object of the present invention is to do away with the disadvantages burdening previously known pipelaying appliances, and to provide an appliance gripping a pipe with a force corresponding to the weight of the pipe, which eliminates damage to light pipes and also that heavy pipes are gripped with insufficient force, the machine operator himself being able to couple the appliance to, and uncouple it from the machine, perform the necessary operations himself for gripping a pipe, take it down into an excavated trench, e.g. one parallel to or right angles to the excavating direction, align the pipe in the trench and thereafter release the pipe.

This object is achieved by the invention being given the characterizing features disclosed in the claims.

PREFERRED EMBODIMENT

Figure 1:
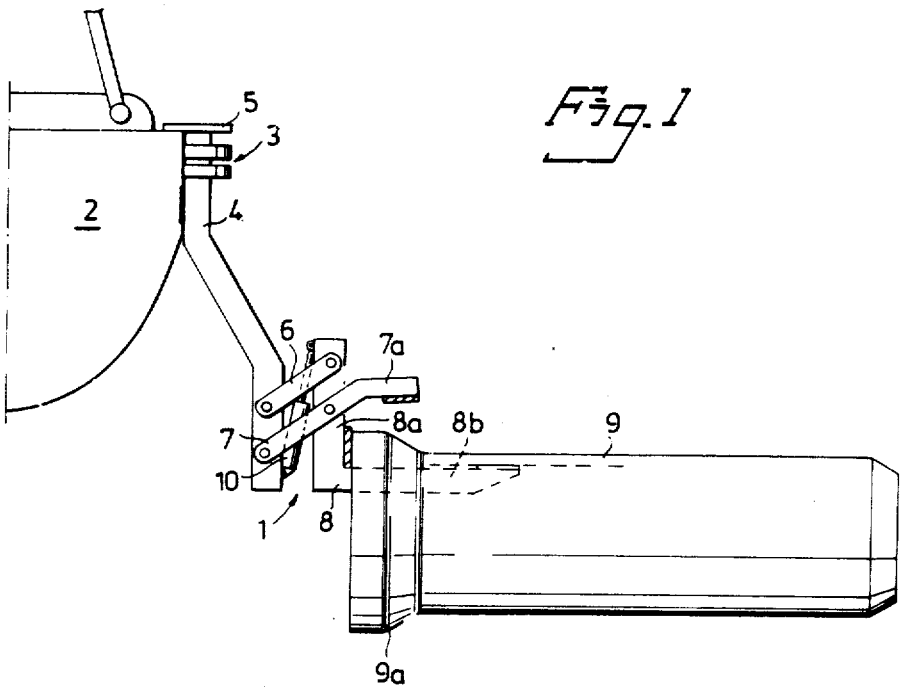
FIG. 1 is a schematic side view of a pipelaying appliance in accordance with the invention, connected to an excavation bucket provided with a gripping means and in position for gripping a cement pipe.

The appliance I illustrated in the Figures is intended to be gripped by a gripping means mounted on a raisable and lowerable apparatus, e.g. a crane or an excavator of the kind illustrated in the Swedish Patent Specification No. 7714027-5. In the Figures, the raisable and lowerable apparatus is illustrated in the form of a portion of the mentioned excavator bucket 2 with a gripping means 3 comprising two fingers movable to and away from each other which are pivotably mounted on the back of the bucket.

The appliance 1 comprises a bar or upright 4 suitably provided with a circular cross section, which can be gripped by the gripping means 3, independent of how the upright is rotated round its longitudinal axis, the bar being provided with an upper plate 5 intended to engage with a portion thereof against the upper surface of the bucket 2 to prevent the appliance from sliding downwards between the fingers 3 when the appliance carries a heavy pipe. At the lower portion of the upright 4, projecting somewhat farther from the bucket 2 than the upper portion thereof, so that the machine operator will be able to see the remaining part of the appliance better during pipelaying, there are pivotably mounted the first ends of a link 6 and a gripping arm 7. The other end of the link 6 and an intermediate portion of the gripping arm 7 are pivotably mounted in the vertical arm 8a of an L-shaped arm 8. The four journalling points constitute the corners in a parallelogram formed by the details just described, this parallelogram being variable between the shapes illustrated in FIGS. 1 and 2. The horizontal arm 8b of the gripping arm 8 and the somewhat downwardly angled right-hand portion 7a of the gripping arm 7 form the jaws in the means gripping a cement pipe 9.

A spring means, suitably a so-called gas spring 10, is pivotably mounted on, and extends between the lower portion of the upright 4 and the upper part of the arm 8a. The pressing force in the spring 10 is somewhat greater than the sum of the weight of the link 6, arm 7 and arm 8, so as to keep the jaws 7a and 8a in the open position illustrated in FIG. 1.

When a length of trench in which it is intended to lay cement piping is excavated by the bucket 2, the bucket is manoeuvered by the machine operator so that it is moved to the appliance 1, lying or upright on the ground at the side of the trench, the gripping means 3 then being opened and caused to surround and grip the upright 4 of the appliance, the bucket then being lifted and turned so that it and the appliance assume the attitude illustrated in FIG. 1. The appliance 1 is then aligned so that the arm 8b of the gripping arm 8 is inserted in the end of the cement pipe 9 having an enlarged flange 9a, and the gripping arm portion 7a is moved to a position on the outside of the pipe opposite the arm 8b. The arm 8b is inserted into the pipe until a rubber-covered portion of the arm 8a comes against the flange 9a.

The bucket 2 is now raised, whereon the arm 8b is lifted into contact with the inner wall of the pipe 9 and is pressed against it, the spring means 10 thus being compressed by a force corresponding to the compressing force. When the compressing force has been surmounted, the gripping arms 7 and 8 and remaining portions of the appliance assume the positions illustrated in FIG. 2, with the rubber-covered arms 7a and 8b exercising a light clamping action on the pipe wall.

Figure 2:
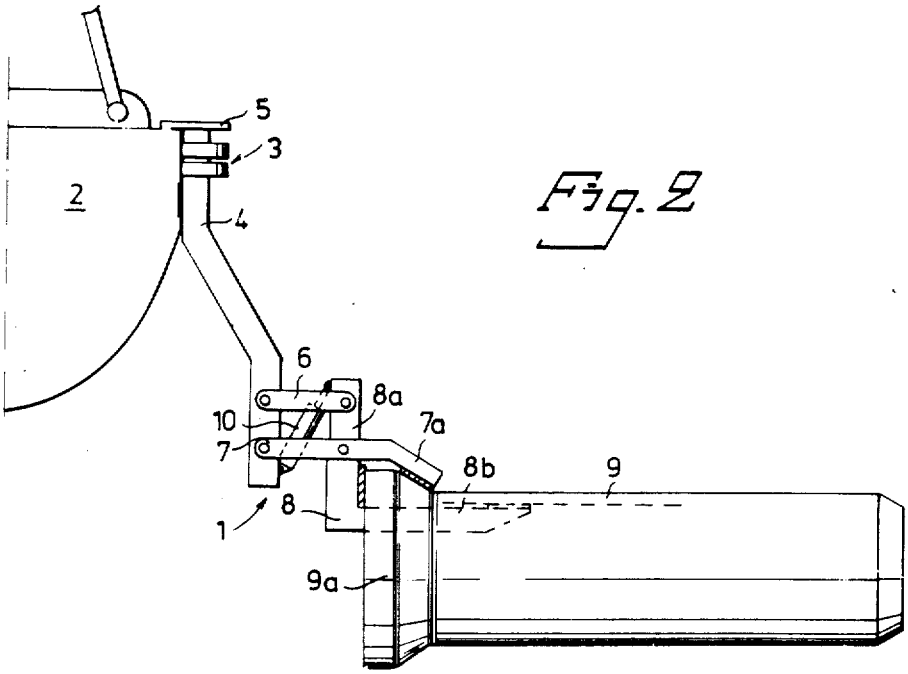
FIG. 2 is a side view similar to the one in FIG. 1 but with the appliance gripping and lifting the cement pipe.

In continued raising of the bucket 2, the pipe 9 is lifted by the arm 8b, it and the arm 7a still keeping the positions illustrated in FIG. 2, and are pressed against the pipe wall by a force corresponding to the weight of the pipe. This is important, since a large clamping force is required to retain heavy pipes, and since smaller and more frangible pipes must not be subjected to clamping forces so large that they break. To improve retention of the pipe, the arm 7a should be somewhat inclined, so that it engages against the pipe in the area where the flange 9a merges into the cylindrical pipe wall. The rubber cladding on the arms 7a and 7b increases the friction between these and the pipe, thereby improving retention, as well as preventing the pipe from being damaged.

The bucket 2 is then swung in the horizontal plane to a position above the trench, and the bucket lowered into the trench such that the gripped pipe will be in line with pipes previously laid in the trench. The bucket is then moved forwards (to the right in FIG. 2) so that the righthand end of the pipe is inserted in a pipe the same as the pipe 9. After the pipe 9 has been inserted in the previously laid pipe, the bucket 2 is lowered, for separating the arms 7a and 8b from each other and releasing their grip on the pipe wall. If the pipe 9 is to be thrust further into the previously laid pipe, the bucket can be manoeuvered so that the rubber cladding on the arm 8a presses the flange 9a to the right.

The appliance 1 is now removed from the pipe 9 and can be used to lay a further pipe in the trench, or it can be uncoupled from the bucket by opening the gripping means 3 and laid on the ground adjacent the trench for use when one or more new pipes are to be laid in a further portion of the trench excavated by the bucket.

Although only one embodiment of the invention has been shown and described, it should be understood that the invention is not limited to this embodiment but only by the disclosures in the claims.

I claim:

1. A pipelaying appliance, connected to a raisable and lowerable apparatus such as an excavator or a crane, and including a gripping means for removable engagement with a pipe, said means comprising a first member projecting into the pipe and an opposing second member on the outside of said pipe, said first and second members being movable to and from each other and connected to said appliance so that the clamping force provided by said first and second members on the wall of said pipe will be proportional to the weight of said pipe carried by said gripping means, characterized by a spring means exerting a force on both said first and second members for the mutual displacement thereof when they are not in engagement with said pipe, the weight of which substantially exceeds this force, wherein the first member is L-shaped with a substantially horizontal arm engaging said pipe and a substantially vertical arm parallel to a third member on said appliance, said third member being connected to said raisable and lowerable apparatus and movably connected to said vertical arm via a link and a portion of said second member parallel to said link.

2. Appliance as claimed in claim 1, characterized in that the angular attitude of said first member relative to the horizontal plane is substantially unaltered during its insertion into, and support of said pipe.

3. Appliance as claimed in claim 1, characterized in that said substantially horizontal and vertical arms engaging with said pipe carried by said gripping means are clad with elastic material.

4. Appliance as claimed in claim 1, characterized in that said third member comprises a rod or bar which can removably be gripped by a second gripping means mounted on an excavator independent of how said rod or bar is turned around its longitudinal axis.

5. Appliance as claimed in claim 1, characterized in that said spring means acts between said first member and said third member.

6. A pipelaying appliance, connected to an excavator bucket and including first and second gripping means said first gripping means for removable engagement with a pipe, said first gripping means comprising a first member projecting into said pipe and an opposing second member on the outside of said pipe, the members being movable to and from each other and connected to said appliance so that the clamping force provided by said first and second members on the wall of said pipe will be proportional to the weight of said pipe carried by said first gripping means, at least one of said first and second members being connected to a bar to be removably gripped by said second gripping means mounted on said excavator bucket and remotely controlled by the excavator operator whereby said bar and said appliance will assume one of an infinitely variable number of positions in relation to said excavator bucket.

* * * * *